United States Patent
Ludden et al.

(10) Patent No.: US 7,302,556 B2
(45) Date of Patent: Nov. 27, 2007

(54) METHOD, APPARATUS AND COMPUTER PROGRAM PRODUCT FOR IMPLEMENTING LEVEL BIAS FUNCTION FOR BRANCH PREDICTION CONTROL FOR GENERATING TEST SIMULATION VECTORS

(75) Inventors: John Martin Ludden, Essex Junction, VT (US); Jeremy John Salsman, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 622 days.

(21) Appl. No.: 10/671,366

(22) Filed: Sep. 25, 2003

(65) Prior Publication Data

US 2005/0081102 A1    Apr. 14, 2005

(51) Int. Cl.
*G06F 7/06* (2006.01)

(52) U.S. Cl. .................. 712/239; 712/239; 712/235; 712/233; 712/234

(58) Field of Classification Search ............... 712/239, 712/235, 233, 234
See application file for complete search history.

(56) References Cited

U.S. PATENT DOCUMENTS

| | | | | |
|---|---|---|---|---|
| 5,781,789 A | * | 7/1998 | Narayan | 712/23 |
| 6,141,748 A | * | 10/2000 | Tran | 712/239 |
| 6,321,186 B1 | * | 11/2001 | Yuan et al. | 703/15 |
| 7,051,189 B2 | * | 5/2006 | Warnes | 712/210 |
| 2003/0225998 A1 | * | 12/2003 | Khan et al. | 712/210 |

* cited by examiner

*Primary Examiner*—Alford Kindred
*Assistant Examiner*—Vincent Lai
(74) *Attorney, Agent, or Firm*—Joan Pennington

(57) ABSTRACT

A method, apparatus and computer program product are provided for implementing a level bias function for branch prediction control for generating test simulation vectors. User selected options are received for a set of constraints for generating test simulation vectors for branch conditional instructions. Current resource values for predicting a branch for a branch conditional instruction are read. A branch operand field is generated to include a set of valid values using the current resource values and based upon said user selected constraints. The branch operand field defines conditions under which a branch is taken.

18 Claims, 8 Drawing Sheets

B0 FIELD ENCODINGS
200

B0 142

| | | |
|---|---|---|
| 0000z | DECREMENT THE CTR, THEN BRANCH IF THE DECREMENTED CTR(M:63) ≠ 0 AND CR(BI) = 0 | A |
| 0001z | DECREMENT THE CTR, THEN BRANCH IF THE DECREMENTED CTR(M:63) = 0 AND CR(BI) = 0 | B |
| 001at | BRANCH IF CR(BI) = 0 | C |
| 0100z | DECREMENT THE CTR, THEN BRANCH IF THE DECREMENTED CTR(M:63) ≠ 0 AND CR(BI) = 1 | D |
| 0101z | DECREMENT THE CTR, THEN BRANCH IF THE DECREMENTED CTR(M:63) = 0 AND CR(BI) = 1 | E |
| 011at | BRANCH IF CR(BI) = 1 | F |
| 1a00t | DECREMENT THE CTR, THEN BRANCH IF THE DECREMENTED CTR(M:63) ≠ 0 | G |
| 1a01t | DECREMENT THE CTR, THEN BRANCH IF THE DECREMENTED CTR(M:63) = 0 | H |
| 1z1z2 | BRANCH ALWAYS | I |

METHOD, APPARATUS AND COMPUTER PROGRAM PRODUCT FOR IMPLEMENTING LEVEL BIAS FUNCTION FOR BRANCH PREDICTION CONTROL FOR GENERATING TEST SIMULATION VECTORS

FIELD OF THE INVENTION

The present invention relates generally to the data processing field, and more particularly, relates to a method, apparatus and computer program product for implementing a level bias function for branch prediction control for generating test simulation vectors.

DESCRIPTION OF THE RELATED ART

Computer simulation of digital hardware systems has become a common technique used for the design of microprocessor systems, reducing cost and time required. A verification test suite typically used for this purpose include, for example, various functional patterns or simulation vectors which together comprise a representative sample of typical operating instructions or programs that are likely to execute on a microprocessor. The test suite may include simulation vectors that approximate the typical operation of the device such that average operating conditions are reflected.

When generating test simulation vectors of branch conditional instructions, it is difficult to reliably predict whether a branch will be taken, or not taken. Instructions are fetched and completed sequentially until a control or branch instruction alters the instruction flow, either conditionally or unconditionally. A control instruction specifies a new memory location from which to begin fetching instructions. When a fetch unit receives a conditional branch operation and the data upon which the condition is based is not yet available, for example, the instruction that will produce the necessary data has not been executed, fetch unit may use one or more branch prediction mechanisms in branch prediction control unit to predict the outcome of the condition. Control is then speculatively altered until the results of the condition can be determined. If the branch was correctly predicted, operation continues. If the prediction was incorrect, all instructions along the speculative path are canceled or flushed. Since speculative instructions cannot complete until the branch condition is resolved, many high performance out-of-order processors provide a mechanism to map physical registers to virtual registers. The result of execution is written to the virtual register when the instruction has finished executing. Physical registers are not updated until an instruction actually completes. Any instructions dependent upon the results of a previous instruction may begin execution as soon as the virtual register is written. In this way, a long stream of speculative instructions can be executed before determining the outcome of the conditional branch.

Known solutions for generating test simulation vectors of branch conditional instructions require manually initializing resources used by the branch instructions to predict a branch while at the same time using the initialized resources for both hard coding the branch operands and setting control bits used by software accordingly. This is problematic because the resources that are initialized may change prior to the branch instruction causing the hard coded test cases to become invalid and unreliable.

A need exists for an improved mechanism for branch prediction control in modeling test simulation vectors.

SUMMARY OF THE INVENTION

A principal object of the present invention is to provide a method, apparatus and computer program product for implementing a level bias function for branch prediction control for generating test simulation vectors. Other important objects of the present invention are to provide such a method, apparatus and computer program product for implementing a level bias function for branch prediction control for generating test simulation vectors substantially without negative effect and that overcome many of the disadvantages of prior art arrangements.

In brief, a method, apparatus and computer program product are provided for implementing a level bias function for branch prediction control for generating test simulation vectors. User selected options are received for a set of constraints for generating test simulation vectors for branch conditional instructions. Current resource values for predicting a branch for a branch conditional instruction are read. A branch operand field is generated to include a set of valid values using the current resource values and based upon said user selected constraints. The branch operand field defines conditions under which a branch is taken.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
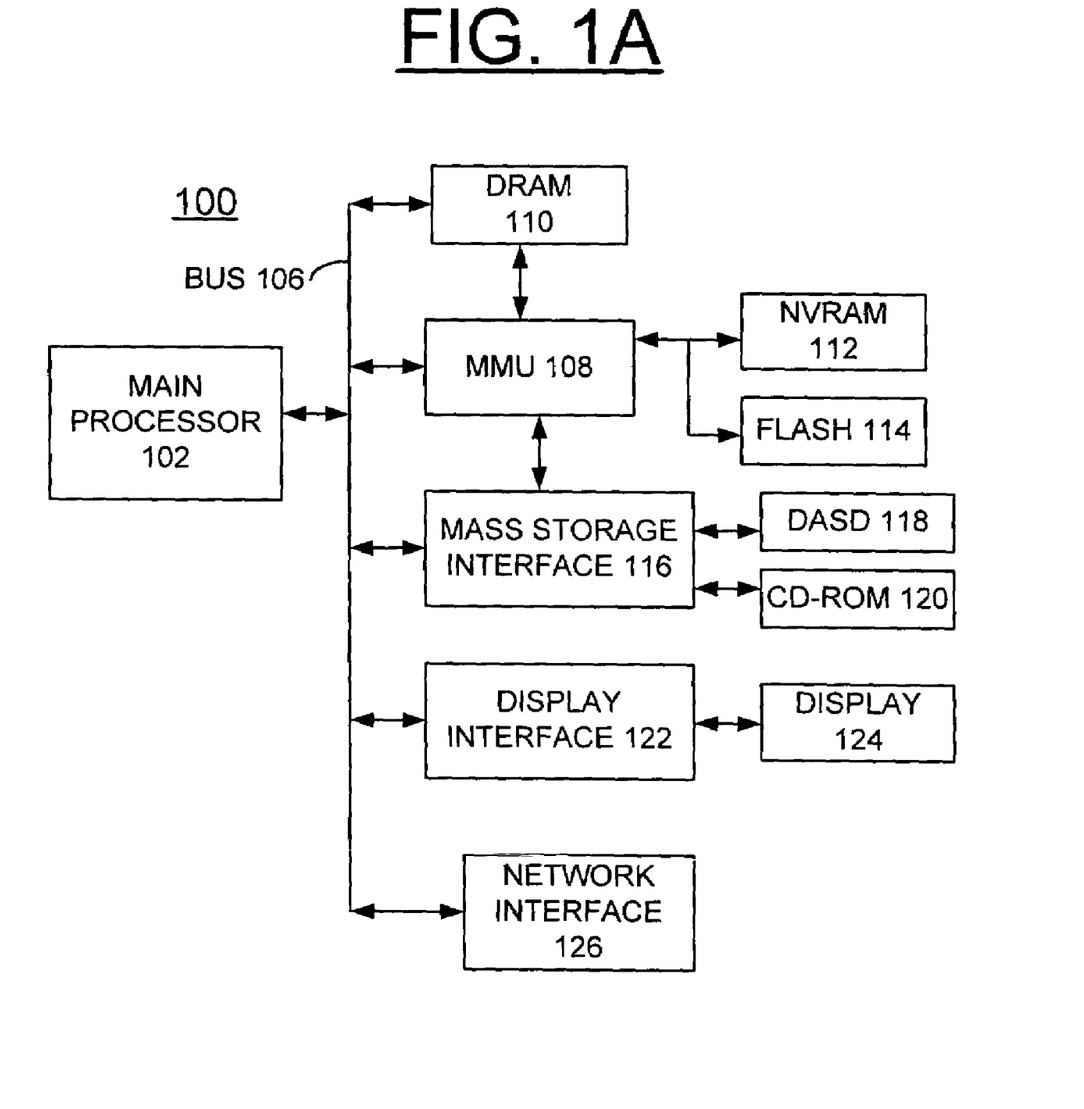
FIGS. 1A and 1B are block diagram representations illustrating a computer system and operating system for implementing a level bias function for branch prediction control in accordance with the preferred embodiment.
Figure 1B:
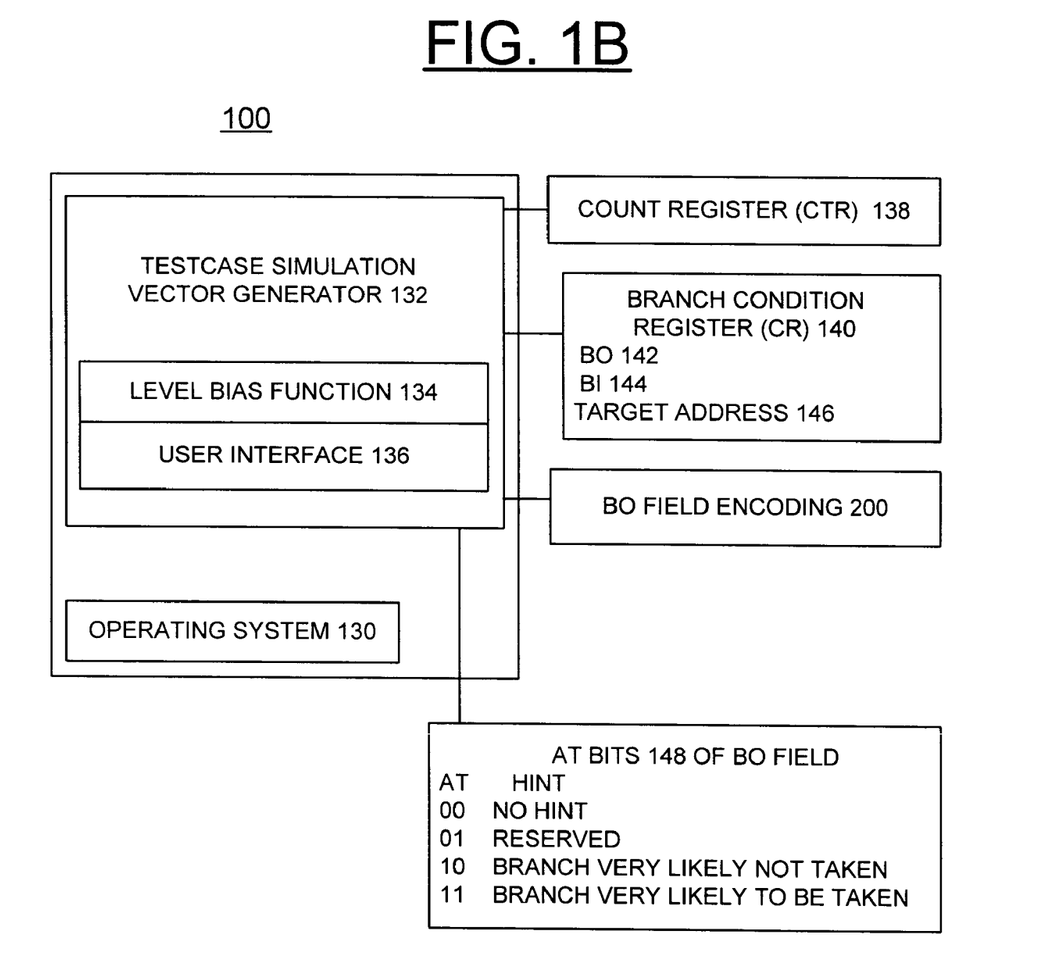

Referring now to the drawings, in FIGS. 1A and 1B there is shown a computer system generally designated by the reference character 100 for implementing a level bias function for branch prediction control in accordance with the preferred embodiment. Computer system 100 includes a main processor 102 or central processor unit (CPU) 102 coupled by a system bus 106 to a memory management unit (MMU) 108 and system memory including a dynamic random access memory (DRAM) 110, a nonvolatile random access memory (NVRAM) 112, and a flash memory 114. A mass storage interface 116 coupled to the system bus 106 and MMU 108 connects a direct access storage device (DASD) 118 and a CD-ROM drive 120 to the main processor 102. Computer system 100 includes a display interface 122 connected to a display 124, and a network interface 126 coupled to the system bus 106.

Computer system 100 is shown in simplified form sufficient for understanding the present invention. The illustrated computer system 100 is not intended to imply architectural or functional limitations. The present invention can be used with various hardware implementations and systems and various other internal hardware devices, for example, multiple main processors.

Figure 2:
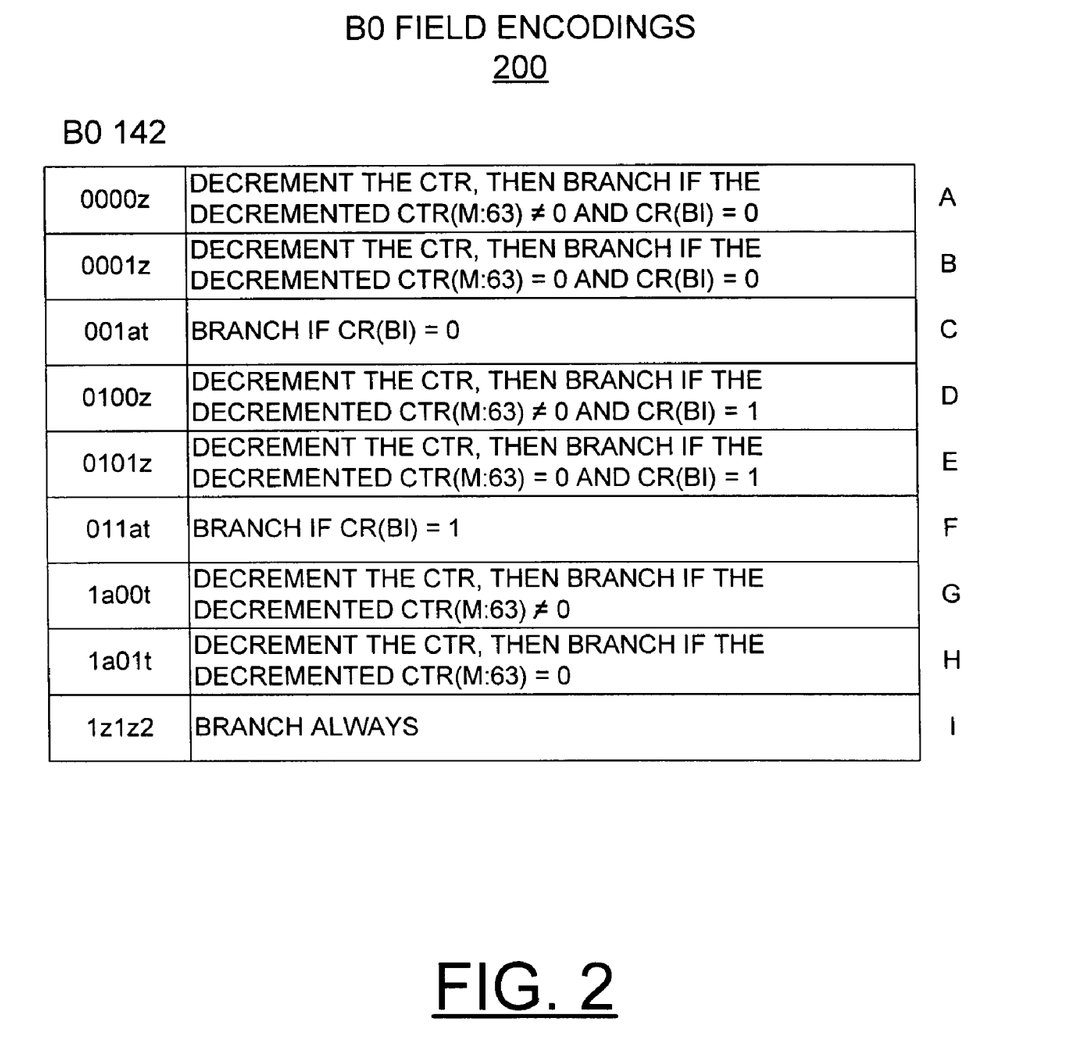
FIG. 2 is a diagram illustrating exemplary branch operand field encoding for implementing a level bias function for branch prediction control in accordance with the preferred embodiment.

As shown in FIG. 1B, computer system 100 includes an operating system 130, a testcase simulation vector generator 132 including a level bias function 134 of the preferred embodiment, and a user interface 136. Resources used by branch instructions to predict a branch include a count register (CTR) 138 and a branch condition register 140. A plurality of fields of the branch condition register 140 include a pair of branch operand fields BO 142, BI 144, and a target address 146 specifying the branch target address. Encoding 200 of the operand field BO 142 is illustrated in FIG. 2.

The branch conditional instructions use the operands BO 142, BI 144 to define the type of branch to be taken or not taken. The BO operand 142 is used to define the conditions under which a branch is taken.

A pair of bits referred to as a 'A' and 'T' bits within the BO operand 142, AT bits 148, are used for prediction by testcase simulation vector generator 132 to provide a hint about whether the branch is likely to be taken or is likely not to be taken. The AT bits 148 are defined as follows:

| BITS | DEFINITION |
| --- | --- |
| AT | Hint |
| 00 | No hint is given |
| 01 | Reserved |
| 10 | The branch is very likely not to be taken |
| 11 | The branch is very likely to be taken |

The condition specified by the BO operand 142 may indicate to read the count register (CTR) 138, the condition register (CR) 140, both, or neither. If BO 142 indicates to read the CR 140, the BI operand 144 of the branch conditional instruction indicates which bit in the CR 140 to read. Based on the value of these resources, the AT bits 148 within the BO operand 142 are set to provide a hint as to the outcome of the branch. The AT bits 142 are not used for every condition the BO operand 142 may represent.

In accordance with features of the preferred embodiment, an operand level bias or level bias function 134 is introduced on the branch conditional instructions. This level bias function 134 of the preferred embodiment reads the resources necessary to predict a branch at the time of the branch conditional instruction. Level bias function 134 creates valid masks for the branch operands BO 142, BI 144 to correctly predict or mis-predict the branch. Advantages of using the use of level bias function 134 of the preferred embodiment are that in all test cases it is possible to reliably predict whether or not a branch will be taken, and the need to rely on any hard coded values as used in the past is eliminated.

In accordance with features of the preferred embodiment, the user generating the branch instruction is presented with a bias to control the value of the BO operand 142. These user selected options presented via user interface 136 are:

1) Branch taken—the percentage of time to take the branch
   100%=branch always taken
   0%=branch is never taken
2) Prediction—the percentage of time to predict a branch
   100%=always create a BO field which uses the AT bits, and always set the AT bits to 10 or 11.
   0%=never create a BO field which uses AT bits, or create a BO field which uses the AT bits, but set the AT bits to 00
3) Accuracy—the percentage of time our AT settings are correct
   100%=when predicting (see # 2 above) the AT settings created are always correct
   0%=when predicting (see # 2 above) the AT settings will never be correct.

Referring now to FIG. 2, there are shown exemplary encoding 200 of the operand field BO 142 for implementing a level bias function for branch prediction control in accordance with the preferred embodiment. The "a" and "t" bits in the illustrated operand BO 142 represent AT bits 148 as defined above and shown in FIG. 1B, and "z" represents a bit that is ignored. The illustrated entries or conditions of operand BO 142 labeled A-I are used in the flowcharts of FIGS. 3, 4, 5, and 6.

In accordance with features of the preferred embodiment, the process implemented by level bias function 134 on the branch conditional instructions starts with a universal set of values for the branch conditional BO field 142, as illustrated by conditions A-I in FIG. 2. Then the branch conditional BO field 142 is reduced to a set of valid values. These valid values satisfy constrains set by the user based on the current state of the machine. The branch conditional BO field 142 is generated for the branch conditional instruction, values of the CTR 138 and CR 140 are read. Using the current value of the resources CTR 138 and CR 140 along with the current value of the BI operand 144, a mask is returned of all possible valid values for the BO operand 140 based on the user's input.

Referring to FIGS. 3, 4, 5, and 6, there are shown exemplary operations for implementing a level bias function for branch prediction control in accordance with the preferred embodiment. The flowcharts of FIGS. 3, 4, 5, and 6 refer to the exemplary conditions A-I shown in FIG. 2 and the constraint 1) percentage of time branch should be taken; constraint 2) the percentage of time branch should be predicted; and constraint 3) the percentage of time the AT settings 148 are correct or the accuracy of the prediction are respectively referred to generally as branch taken, accuracy and prediction settings or branch predicted, and prediction accurate.

Figure 3:
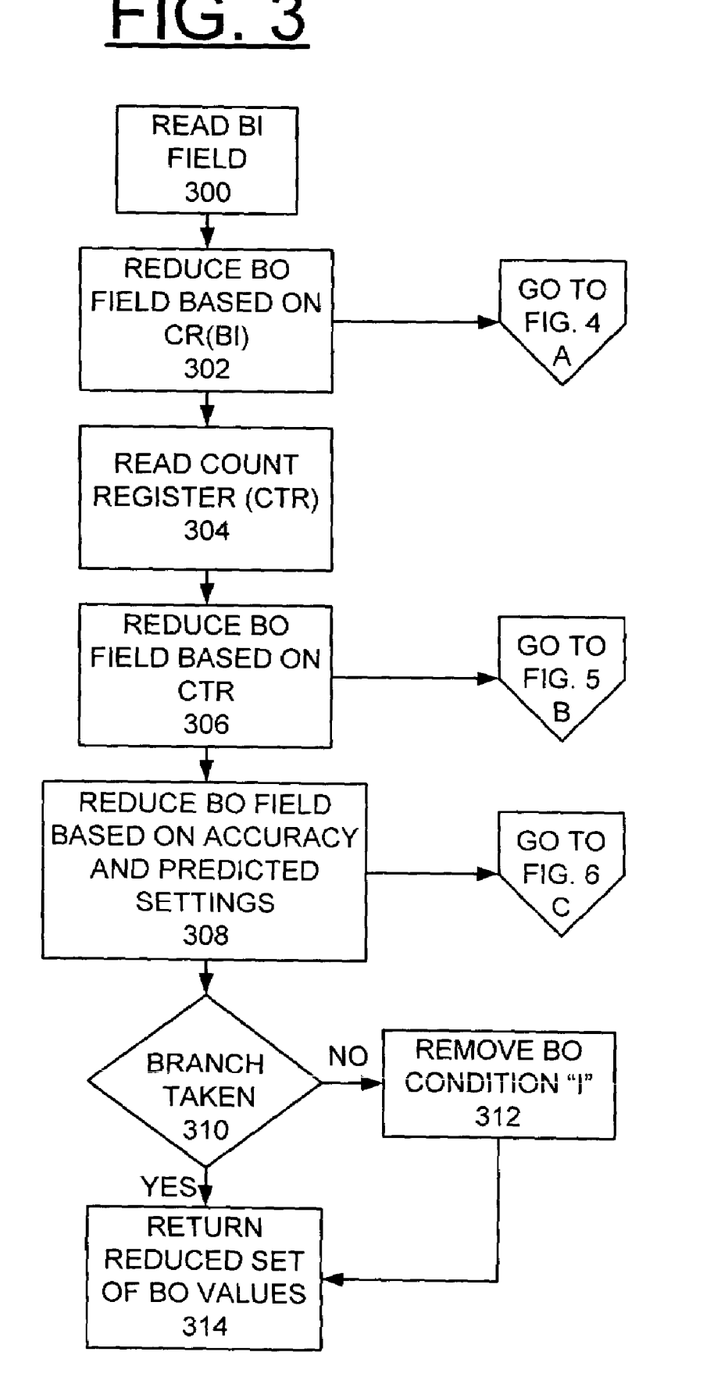
FIGS. 3, 4, 5, and 6 are logical flow diagrams illustrating exemplary operations for implementing a level bias function for branch prediction control in accordance with the preferred embodiment.

Referring now to FIG. 3, there is shown an overview of exemplary operations of the level bias function 134 for branch prediction control for generating test simulation vectors of the preferred embodiment. The operant BI field 144 is read as indicated in a block 300. Then the value of BO 142 is reduced based upon the BI operand 144 as illustrated and described with respect to FIG. 4 as indicated in a block 302. The count register (CTR) 138 is read as indicated in a block 304. Then the value of BO 142 is reduced based upon the CTR 138 as illustrated and described with respect to FIG. 5 as indicated in a block 306. Then the value of BO 142 is reduced based upon accuracy and predicted settings as illustrated and described with respect to FIG. 6 as indicated in a block 308. Checking for the branch taken is performed as indicated in a decision block 310. If the branch was not taken, then condition I is removed from the BO 142 as indicated in a block 312. Otherwise, if the branch was taken, then the reduced set of BO 142 values is returned as indicated in a block 314.

Figure 4:
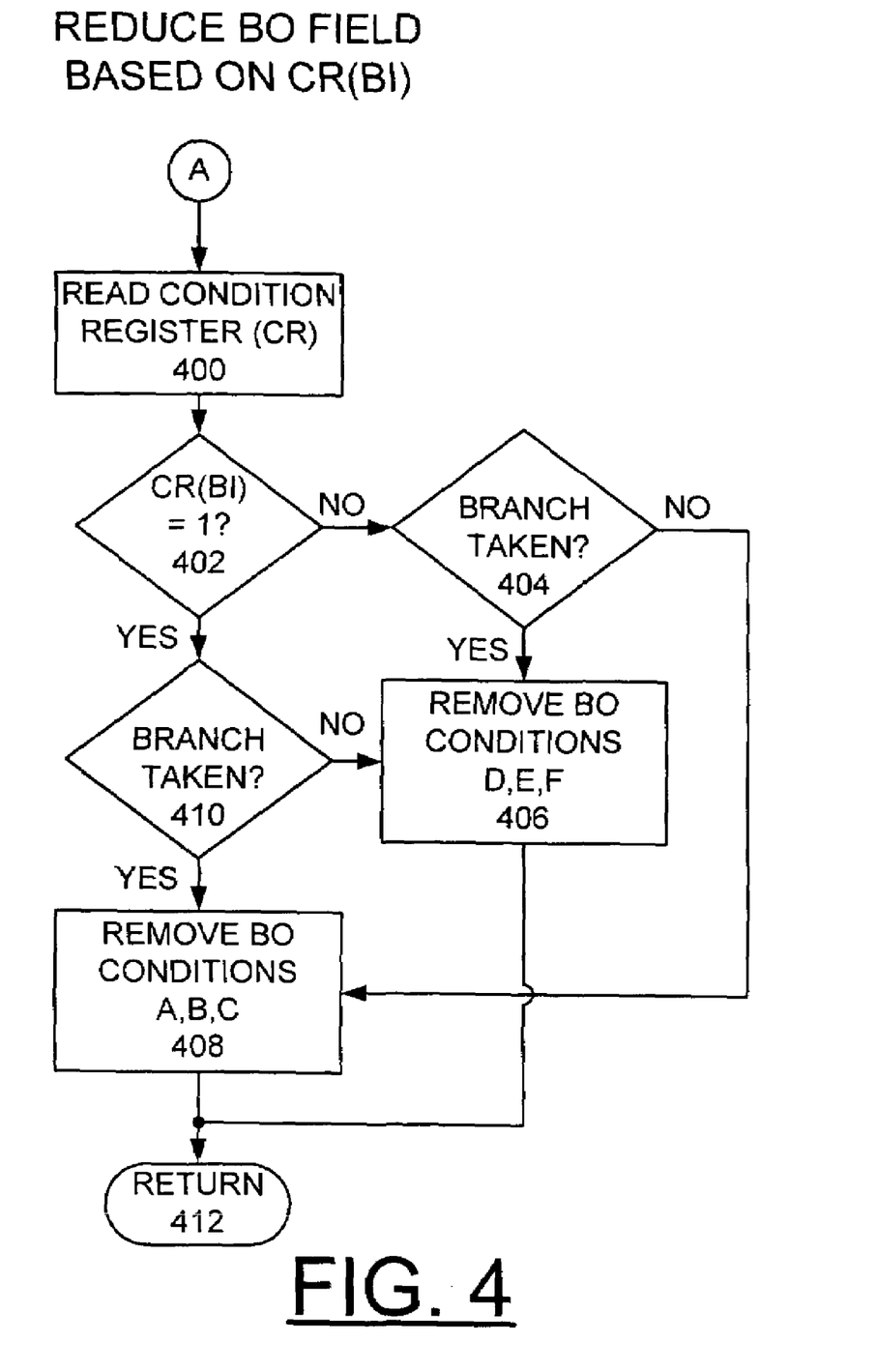

Referring now to FIG. 4, there is shown exemplary operations of the process at block 302 of FIG. 3 to reduce the value of BO 142 based upon the BI operand 144. The branch condition register (CR) 140 is read as indicated in a block 400. Checking whether the BI operand 144 equals one is performed as indicated in a decision block 402. If the BI operand 144 does not equal one, then checking for branch taken is performed as indicated in a decision block 404. Then if the branch was taken conditions D, E, F are removed from BO 142 as indicated in a block 406. Otherwise, if the branch was not taken, conditions A, B, C are removed from BO 142 as indicated in a block 408. If the BI operand 144 equals one at decision block 402, then checking for branch taken is performed as indicated in a decision block 410. If the branch was not taken at decision block 410, then conditions D, E, F are removed from BO 142 at block 406. If the branch was taken at decision block 410, then conditions A, B, C are removed from BO 142 at block 408. Then after D, E, F are removed from BO 142 at block 406, or conditions A, B, C are removed from BO 142 at block 408, the operations return as indicated in a block 412.

Figure 5:
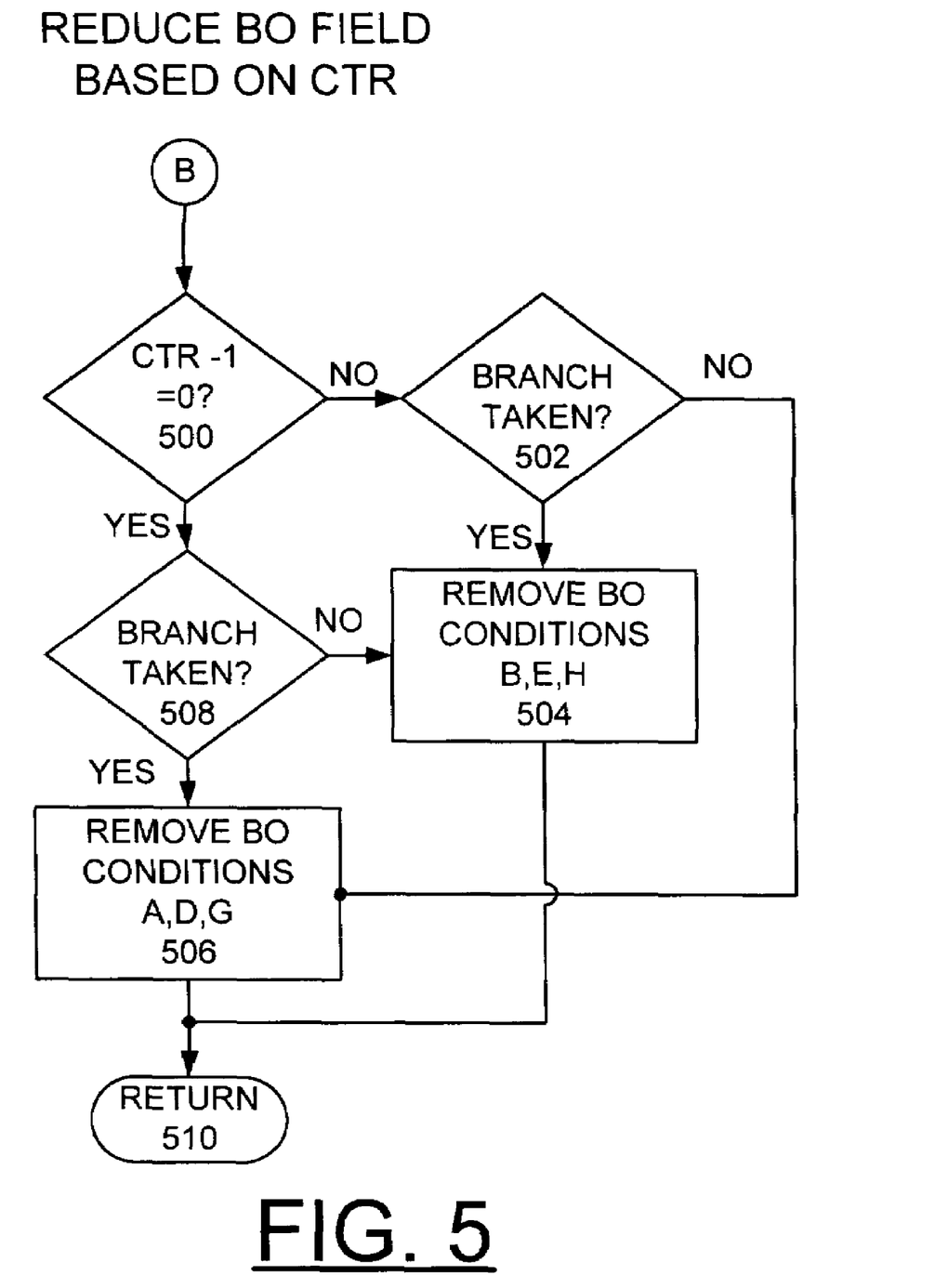

Referring now to FIG. 5, there is shown exemplary operations of the process at block 306 of FIG. 3 to reduce the value of BO 142 based upon the CTR 138. Checking whether CTR decremented by one equals zero is performed as indicated in a decision block 500. If the CTR-1 does not equal zero, then checking for branch taken is performed as indicated in a decision block 502. Then if the branch was taken, conditions B, E, H are removed from BO 142 as indicated in a block 504. Otherwise, if the branch was not taken, conditions A, D, G are removed from BO 142 as indicated in a block 506. If the CTR decremented by one equals zero at decision block 500, then checking for branch taken is performed as indicated in a decision block 508. If the branch was not taken at decision block 508, then conditions B, E, H are removed from BO 142 at block 504. If the branch was taken at decision block 508, then conditions A, D, G are removed from BO 142 at block 506. Then after conditions B, E, H are removed from BO 142 at block 504, or conditions A, D, G are removed from BO 142 at block 506, the operations return as indicated in a block 510.

Figure 6:
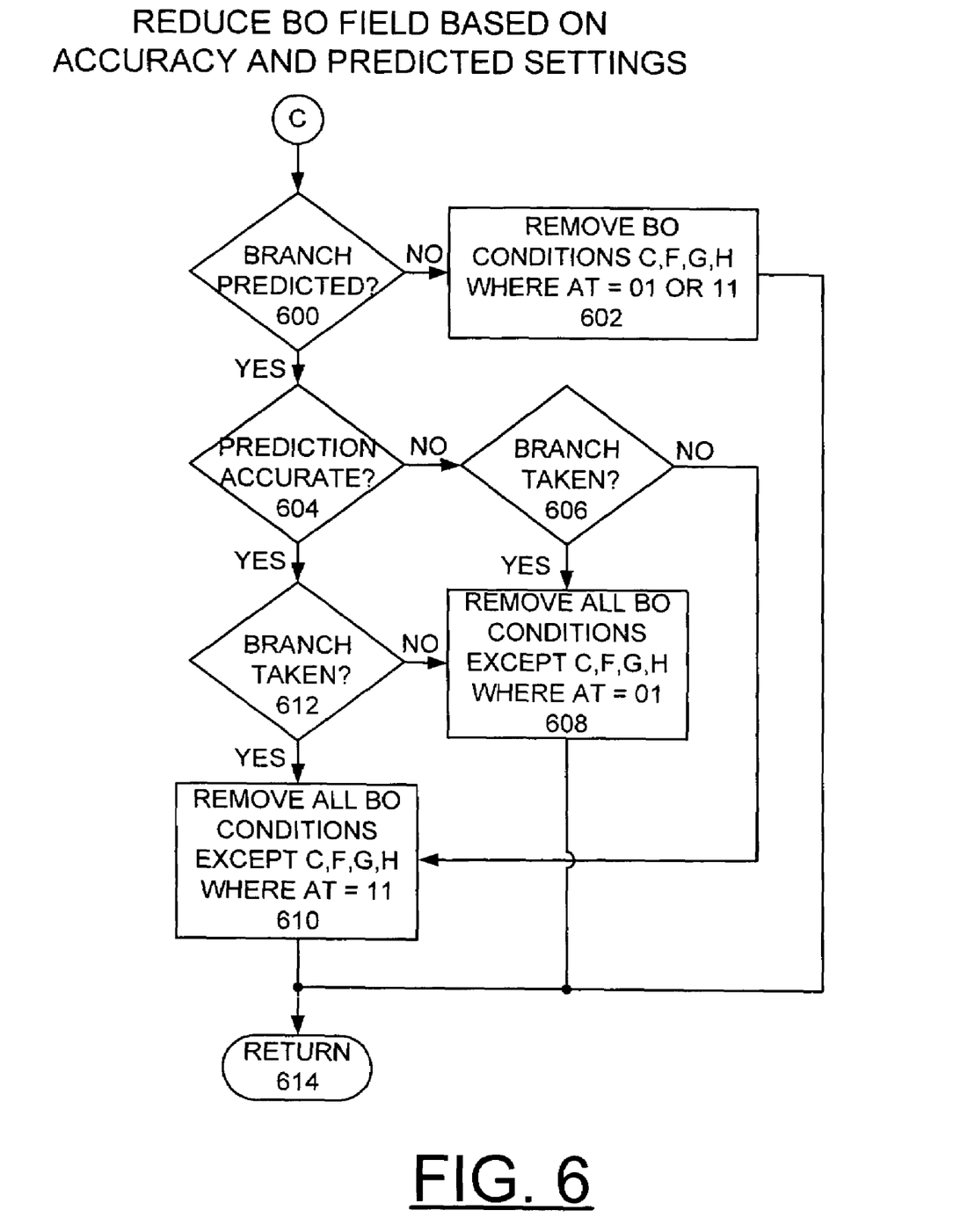

Referring now to FIG. 6, there is shown exemplary operations of the process at block 308 of FIG. 3 to reduce the value of BO 142 based upon accuracy and predicted setting. Checking whether the branch was predicted is performed as indicated in a decision block 600. If the branch was not predicted, then conditions C, F, G, H are removed from BO 142 where AT bits 144 equal 01 or 11 as indicated in a block 602. If the branch was predicted, then checking whether the prediction was accurate is performed as indicated in a decision block 604. If the prediction was not accurate, checking for branch taken is performed as indicated in a decision block 606. Then if the branch was taken, all conditions except for conditions C, F, G, H, are removed from BO 142 where AT bits 144 equal 01 as indicated in a block 608. Otherwise, if the branch was not taken, all conditions except for conditions C, F, G, H are removed from BO 142 where AT bits 144 equal 11 as indicated in a block 610. If the prediction was accurate at decision block 604, then checking for branch taken is performed as indicated in a decision block 612. If the branch was not taken at decision block 508, then all conditions except for conditions C, F, G, H, are removed from BO 142 where AT bits 144 equal 01 at block 608. If the branch was taken at decision block 612, then all conditions except for conditions C, F, G, H, are removed from BO 142 where AT bits 144 equal 11 at block 608. Then after the respective conditions are removed from BO 142 at one of the blocks 602, 608, or 610, then operations return as indicated in a block 614.

Figure 7:
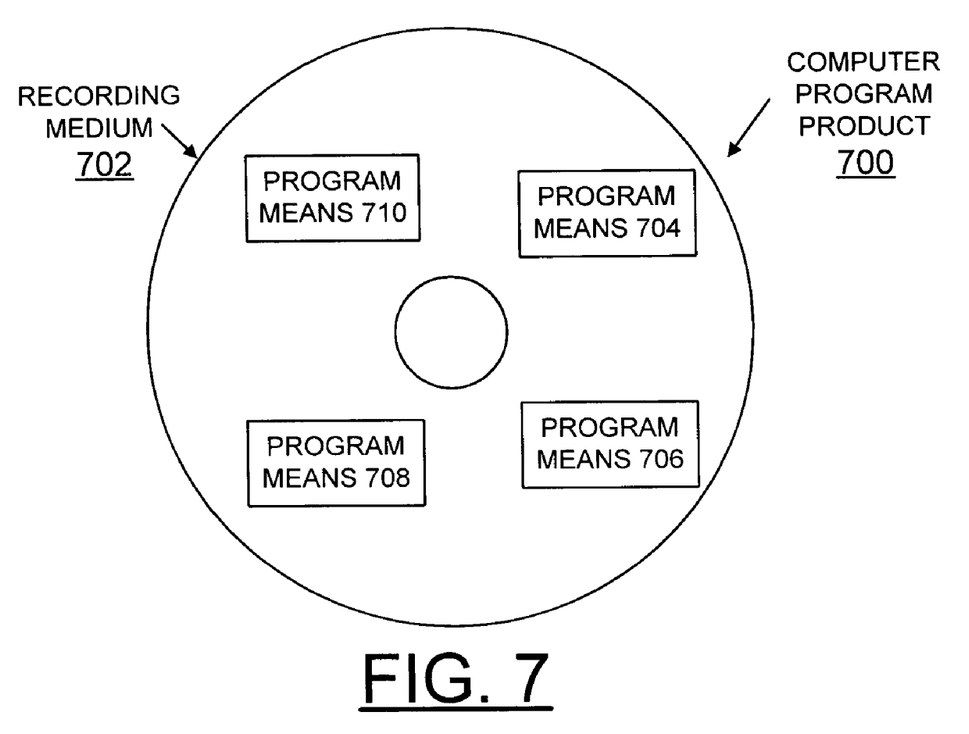
FIG. 7 is a block diagram illustrating a computer program product in accordance with the preferred embodiment.

Referring now to FIG. 7, an article of manufacture or a computer program product 700 of the invention is illustrated. The computer program product 700 includes a recording medium 702, such as, a floppy disk, a high capacity read only memory in the form of an optically read compact disk or CD-ROM, a tape, a transmission type media such as a digital or analog communications link, or a similar computer program product. Recording medium 702 stores program means 704, 706, 708, 710 on the medium 702 for carrying out the methods for implementing a level bias function for branch prediction control for generating test simulation vectors of the preferred embodiment in the system 100 of FIG. 1.

A sequence of program instructions or a logical assembly of one or more interrelated modules defined by the recorded program means 704, 706, 708, 710, direct the computer system 100 for implementing a level bias function for branch prediction control for generating test simulation vectors of the preferred embodiment.

While the present invention has been described with reference to the details of the embodiments of the invention shown in the drawing, these details are not intended to limit the scope of the invention as claimed in the appended claims.

What is claimed is:

1. A method for implementing a level bias function for branch prediction control for generating test simulation vectors comprising the steps of:
   providing a universal set of values for a branch operand field BO;
   receiving user selected options for a set of constraints for generating test simulation vectors for branch conditional instructions;
   reading current resource values for predicting a branch for a branch conditional instruction; and
   reducing said branch operand field BO to include only a set of valid values using said current resource values and based upon said user selected constraints; said branch operand field BO defining conditions under which a branch is taken for said branch conditional instruction.

2. A method for implementing a level bias function for branch prediction control as recited in claim 1 wherein the step of receiving user selected options for a set of constraints includes the steps of receiving user selected options for constraints including a percentage branch should be taken; a percentage branch should be predicted; and an accuracy of the prediction.

3. A method for implementing a level bias function for branch prediction control as recited in claim 2 wherein the step of generating said branch operand field to include said set of valid values using said current resource values and based upon said user selected constraints includes the steps of reducing said branch operand field BO based upon user selected options for said percentage branch should be predicted and said accuracy of the prediction constraints.

4. A method for implementing a level bias function for branch prediction control as recited in claim 1 wherein the step of reading current resource values for predicting a branch for a branch conditional instruction includes the steps of reading a count register (CTR) value and a plurality of branch condition register (CR) values; said CR values including a current value of said branch operand field BO, and a current value of a branch operand field BI, said branch operand field BI indicating a CR bit to be read.

5. A method for implementing a level bias function for branch prediction control as recited in claim 4 wherein the step of generating said branch operand field to include said set of valid values using said current resource values and based upon said user selected constraints includes the step of reducing said branch operand field BO based upon a current CR value of said branch operand field BI and based upon said user selected constraints.

6. A method for implementing a level bias function for branch prediction control as recited in claim 4 wherein the step of generating said branch operand field to include said set of valid values using said current resource values and based upon said user selected constraints includes the steps of reducing said branch operand field BO based upon said a current count register (CTR) value and said user selected constraints.

7. A computer readable medium for implementing a level bias function for branch prediction control for generating test simulation vectors in a computer system, said computer readable medium including instructions stored on said computer readable medium consisting one of a floppy disk, a high capacity read only memory in the form of an optically read compact disk or CD-ROM, and a tape, wherein said instructions, when executed by the computer system cause the computer system to perform the steps of:

providing a universal set of values for a branch operand field BO;

receiving user selected options for a set of constraints for generating test simulation vectors for branch conditional instructions;

reading current resource values for predicting a branch for a branch conditional instruction; said current resource values including a count register (CTR) value and a plurality of branch condition register (CR) values; and reducing said universal set for said branch operand field BO to include only a set of valid values using said current resource values and based upon said user selected constraints; said branch operand field defining conditions under which a branch is taken for said branch conditional instruction.

8. A computer readable medium for implementing a level bias function for branch prediction control as recited in claim 7 wherein the step of receiving user selected options includes the step of receiving user selected options for said set of constraints including a percentage branch should be taken; a percentage branch should be predicted; and an accuracy of the prediction.

9. A computer readable medium for implementing a level bias function for branch prediction control as recited in claim 8 wherein the step generating said branch operand field BO to include said set of valid values using said current resource values and based upon said user selected constraints includes the step of reducing said branch operand field BO based upon based upon said user selected options for said percentage branch should be predicted and said accuracy of the prediction constraints.

10. A computer readable medium for implementing a level bias function for branch prediction control as recited in claim 7 wherein the step reading current resource values includes the steps of reading a current CR value of said branch operand field BO, a current CR value of a branch operand field BI and a current CTR value.

11. A computer readable medium for implementing a level bias function for branch prediction control as recited in claim 10 wherein the step generating said branch operand field BO to include said set of valid values using said current resource values and based upon said user selected constraints includes the step of reducing said branch operand field BO based upon said current CR value of said branch operand field BI and based upon said user selected constraints.

12. A computer readable medium for implementing a level bias function for branch prediction control as recited in claim 10 wherein the step generating said branch operand field BO to include said set of valid values using said current resource values and based upon said user selected constraints includes the step of reducing said branch operand field BO based upon said current CTR value and based upon said user selected constraints.

13. Apparatus for implementing an operand level bias for branch prediction control for generating test simulation vectors comprising:

a user interface for receiving user selected options for a set of constraints for generating test simulation vectors for branch conditional instructions;

a count register (CTR) and a branch condition register (CR) for storing current resource values for predicting a branch for a branch conditional instruction; and a level bias function for providing a universal set of values for a branch operand field BO of said branch condition register (CR) and for reducing said universal set for branch operand field BO to include only a set of valid values using said current resource values and based upon said user selected constraints; said branch operand field BO defining conditions under which a branch is taken for said branch conditional instruction.

14. Apparatus for implementing an operand level bias for branch prediction control as recited in claim 13 wherein set of constraints includes a percentage branch should be taken; a percentage branch should be predicted; and an accuracy of the prediction.

15. Apparatus for implementing an operand level bias for branch prediction control as recited in claim 14 wherein said level bias function generates said branch operand field BO using said percentage branch should be predicted and said accuracy of the prediction constraints to reduce said current value of said branch operand field BO to include said set of valid values.

16. Apparatus for implementing an operand level bias for branch prediction control as recited in claim 13 wherein said branch condition register (CR) stores current resource values including a current value of said branch operand field BO and a current value of a branch operand field BI, said branch operand field BI indicating a CR bit to be read; and said count register (CTR) stores a current count value.

17. Apparatus for implementing an operand level bias for branch prediction control as recited in claim 16 wherein said level bias function generates said branch operand field BO using said current value of said branch operand field BI and based upon said user selected constraints to reduce said current value of said branch operand field BO to include said set of valid values.

18. Apparatus for implementing an operand level bias for branch prediction control as recited in claim 16 wherein said level bias function generates said branch operand field BO using said current count value of said count register (CTR) and based upon said user selected constraints to reduce said current value of said branch operand field BO to include said set of valid values.

* * * * *